United States Patent [19]

Andersson et al.

[11] 4,026,365

[45] May 31, 1977

[54] CASTER WHEEL SUPPORTED AGRICULTURAL IMPLEMENT WITH SELF-LOCKING CASTER WHEEL

[75] Inventors: Ingemar R. Andersson, Downers Grove; Charles Boetto, Naperville, both of Ill.

[73] Assignee: International Harvester Company, Chicago, Ill.

[22] Filed: Nov. 10, 1975

[21] Appl. No.: 630,110

[52] U.S. Cl. .............................. 172/386; 56/228; 172/413; 172/625; 280/415 R
[51] Int. Cl.² .................. A01B 63/22; B60D 1/00
[58] Field of Search .......... 172/240, 248, 386, 413, 172/448, 625, 668, 677; 280/413, 415 R, 415 A, 478 B; 56/218, 228; 16/35 R

[56] References Cited

UNITED STATES PATENTS

| | | | |
|---|---|---|---|
| 2,955,848 | 10/1960 | Hyland et al. | 280/415 R X |
| 3,094,172 | 6/1963 | Ose et al. | 172/625 X |
| 3,240,005 | 3/1966 | Rowse | 56/228 X |
| 3,324,956 | 6/1967 | Ritchie | 172/386 |
| 3,636,586 | 1/1972 | Bollinger et al. | 16/35 |
| 3,705,560 | 12/1972 | Lappin | 280/415 R X |
| 3,751,758 | 8/1973 | Higbee et al. | 16/35 |
| 3,793,752 | 2/1974 | Snyder | 172/413 X |
| 3,910,605 | 10/1975 | Danford | 280/415 R |

Primary Examiner—Richard T. Stouffer
Attorney, Agent, or Firm—F. David AuBuchon; Floyd B. Harman

[57] ABSTRACT

A transversely and linearly elongated tractionally supported tool-carrying frame for agricultural implements having caster wheels which are shiftable individually and vertically relative to the frame to move the latter, and consequently the tools, between raised inoperative and lower earth-working positions. A central tractor hitch on the frame enables the latter to be pulled in broadside fashion forwardly for earth-working purposes when the frame and tools are in their lowered earth-working positions, and a second tractor hitch at one end of the frame enables the latter to be pulled linearly sidewise for transport purposes when the frame and tools are raised. A salient feature of the invention resides in a novel arrangement for automatically latching one of the caster wheels against free caster trailing during such sidewise transport movement of the implement to thereby lend a stabilizing influence to the implement and inhibit side sway.

11 Claims, 8 Drawing Figures

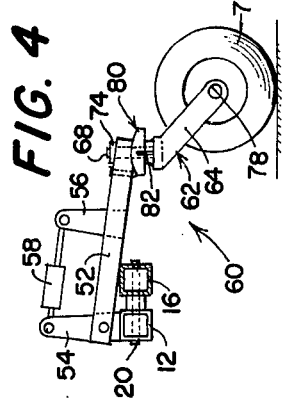
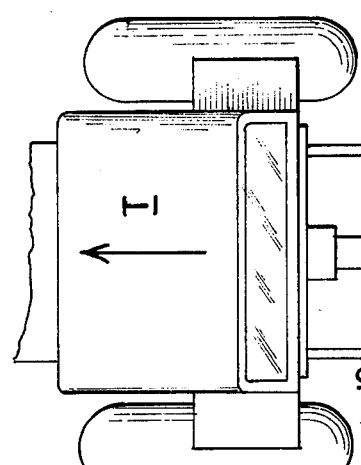
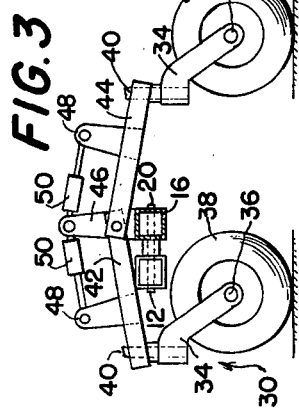
FIG. 1
FIG. 2
FIG. 3
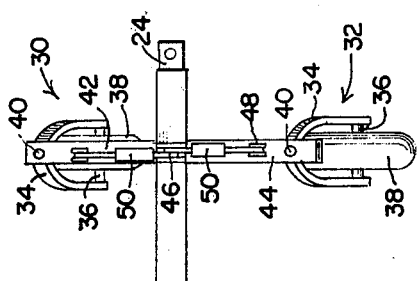
FIG. 4
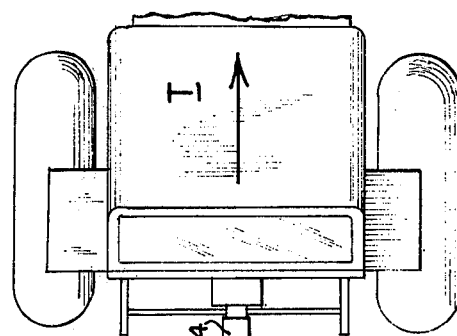
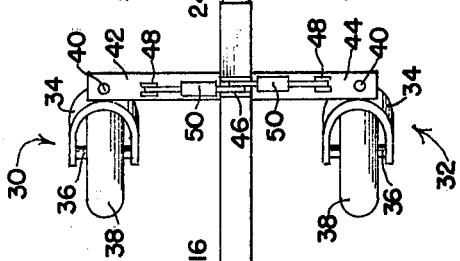
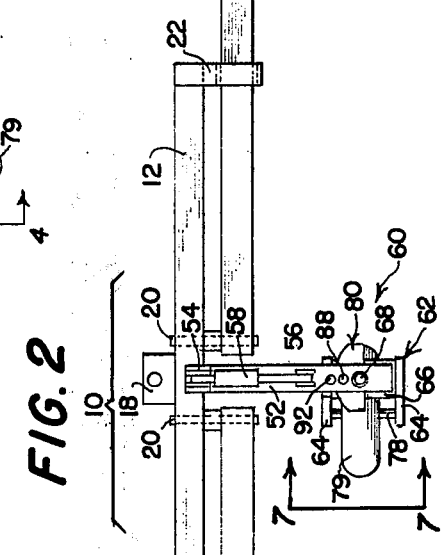
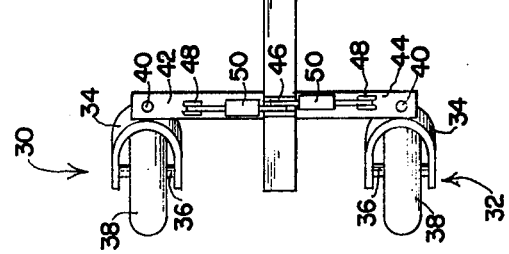

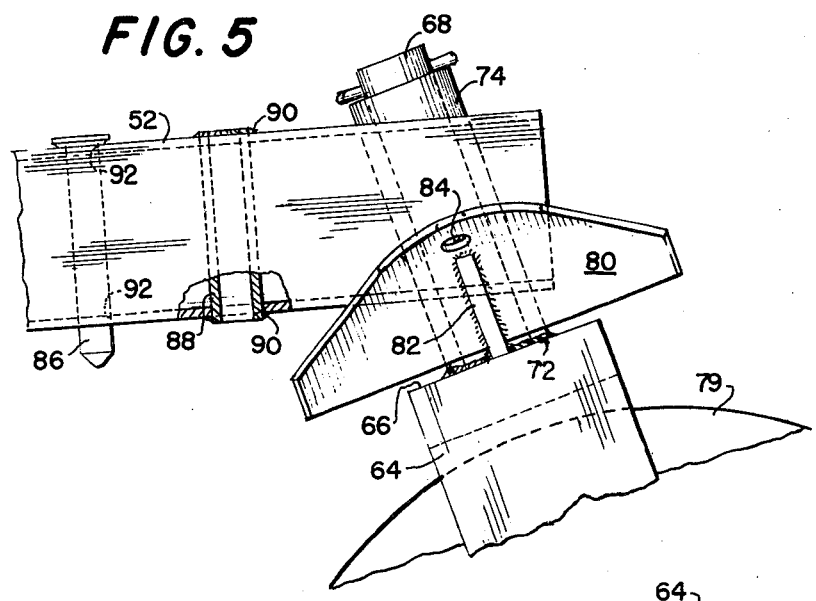
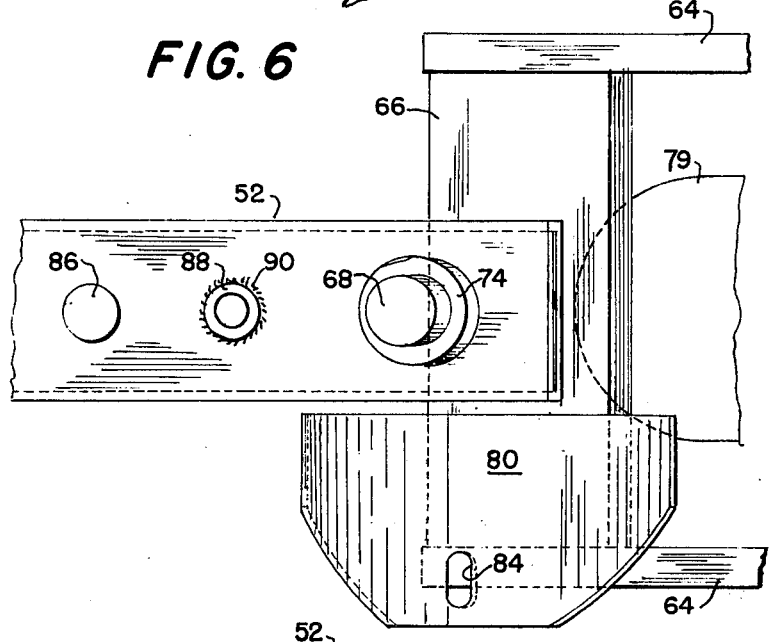
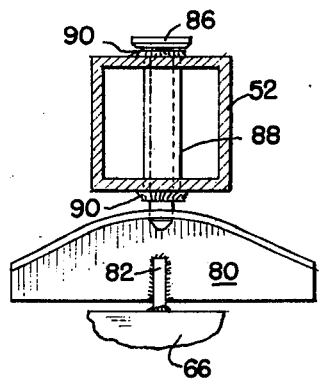
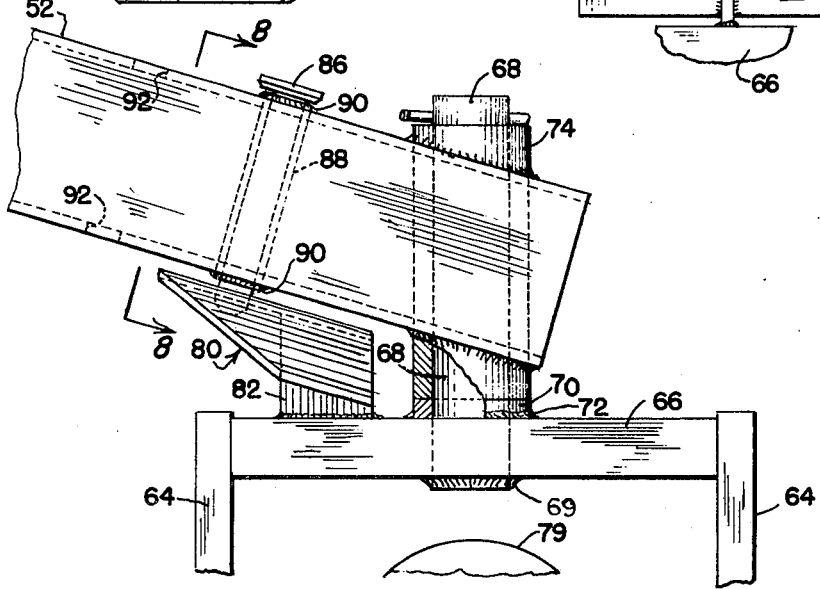

4,026,365

CASTER WHEEL SUPPORTED AGRICULTURAL IMPLEMENT WITH SELF-LOCKING CASTER WHEEL

The improved tool-carrying framework comprising the present invention has been designed for use primarily in connection with agricultural implements, as for example a seed planter, of the type which employs an elongated transversely extending tool bar having a centrally disposed tractor hitch by means of which the implement may be pulled forwardly when the tool bar and earth-working devices carried thereby are lowered for seed planting operations, and also a second and alternative tractor hitch at one end of the tool bar and by means of which the implement may be pulled sidewise when the tool bar and its implements are raised for transport purposes. Thus, during forward movement of the implement the elongated tool bar passes broadside over the ground so that the laterally spaced earth-working tools carried thereby cover the wide swath which is necessary for multiple row planting or other earth-working operations. On the other hand, during sidewise movement of the implement when the tool bar is traveling endwise and linearly, the planting or other tools follow one another in single file so that the transport width of the implement is very materially reduced, thus adapting the implement for road transportation and allowing the same to pass over narrow bridges, through gates or otherwise accommodate tight places. Agricultural implements having dual hitch facilities which are designed for this purpose are known, as also is the use of caster wheels for the tractional support of the implement framework so that when the transition from earth-working to transport motivation is effected, such caster wheels will automatically follow the direction of travel. However, such implements are possessed of certain limitations, principal among which is the difficulty involved in causing caster wheels to perform the necessary gauging and lifting functions, and also, where multiple section tool bars are concerned, difficulty is encountered in making sharp turns during transport.

The present invention is designed not only to overcome the above noted limitations that are attendant upon the construction and use of dual-hitch agricultural implements, but also to offer certain advantages thereover. Toward this end, the invention contemplates the provision of a framework construction including a forward transversely extending support bar having a centrally disposed tractor hitch, and a rear divided composite tool bar consisting of two transversely extending sections immediately behind the support bar and which normally are disposed in end-to-end alignment. The adjacent ends of the tool bar sections are pivoted to the support bar for independent limited swinging movement about horizontal axes so that the bars may rise and fall in accordance with an undulatory ground pattern. The outer end of one of the tool bar sections is provided with a second and alternative tractor hitch. The framework is tractionally supported by five caster wheels including forwardly and rearwardly offset wheels at the outer ends of each tool bar section, and a rearwardly offset central wheel in the medial region of the support bar. Hydraulic means are provided for individually raising and lowering each caster wheel relative to its supporting frame member. Thus, by raising four of the caster wheels, the composite two-part tool bar is lowered for earth-working purposes and all of the caster wheels function in their usual free caster trailing manner as the implement is pulled forwardly. For earth-working purposes the middle wheel is lifted off the ground.

When the alternative or second tractor hitch is used to pull the implement sidewise, it is contemplated that in accordance with the present invention the two outer rear caster wheels shall be raised while the two outer front caster wheels and the rear center wheel shall remain lowered so that the implement will then travel on only three caster wheels, namely the two front caster wheels and the single rear center caster wheel. In order to lend stability to the implement and inhibit side sway thereof during road transport, means are provided for automatically locking the center rear caster wheel in the normal trailing position which it assumes as soon as the tractor commences its forward motion in the sidewise direction of the implement. Such means constitutes one of the principle features of the invention and, in addition to inhibiting side sway, it possesses the additional advantage that with the caster wheel thus locked, good maneuverability is provided, especially when making a sharp turn. During such a sharp turn, the framework pivots about the thus fixed caster wheel so that the turning radius amounts to approximately one-half of the frame length.

The provision of a tool-carrying framework such as has briefly been outlined above, and possessing the stated advantages, constitutes the principal object of the present invention. Numerous other objects and advantages, not at this time enumerated, will become readily apparent as the nature of the invention is better understood.

In the accompanying two sheets of drawings forming a part of this specification, one illustrative embodiment of the invention has been shown.

BRIEF DESCRIPTION OF THE DRAWINGS

FIG. 1 is a plan view largely schematic in its representation, of the wheel-supported, tool-carrying framework of an agricultural implement embodying the principles of the present invention, and showing such framework in its operative earth-working condition and connected to a motivating tractor for forward longitudinal movement;

FIG. 2 is a plan view of the structure shown in FIG. 1, showing the tool-carrying framework in an inoperative condition of transport and connected to the tractor for sidewise movement;

FIG. 3 is a sectional view taken on the line 3—3 of FIG. 1;

FIG. 4 is a sectional view taken on the line 4—4 of FIG. 1;

FIG. 5 is a fragmentary enlarged side elevational detail view of a portion of the structure shown in FIG. 1, the view being taken in the direction of the arrows associated with the line 5—5;

FIG. 6 is a top plan view of the structure shown in FIG. 5;

FIG. 7 is a fragmentary enlarged side elevational detail view of a portion of the structure shown in FIG. 2, the view being taken in the direction of the arrows associated with the line 7—7; and FIG. 8 is a sectional view taken on the line 8—8 of FIG. 7.

Referring now to the drawings in detail, and in particular to FIGS. 1 and 2, there is disclosed in these views the tool bar framework 10 of an agricultural implement which, for purposes of discussion herein, may be regarded as a seed planter, although such framework is readily adaptable for use in connection with a wide variety of other agricultural implements such as a cultivator or the like. The framework 10 is wheel-supported as will be described in detail subsequently and it involves in its general organization a front or forward transversely extending horizontal support bar 12 and a pair of normally aligned transversely extending left and right tool bars 14 and 16 respectively.

The support bar 12 is provided in the medial region thereof with conventional means for connecting to a tractor hitch by which the implement as a whole may be drawn by a suitable prime mover such as the illustrated tractor T. On opposite sides of the center of support bar 12 are a pair of rearwardly extending pivot pins or shafts 20, such shafts serving to pivotally support the opposed or adjacent inner ends of the right and left tool bars 14 and 16 respectively. The extreme outer ends of the support bar 12 are provided with a pair of support brackets 22 which slidingly encompass the medial regions of tool bars 14 and 16 in such a manner that such bars are free to rock upwardly and downwardly about the pivot shafts 20 and thus follow the contour of any undulatory ground surface which may be encountered when the implement moves forwardly under the influence of the tractor hitch. Reference may be made to U.S. Pat. No. 3,741,312 for a pivotal frame structure of this general type. According to the present invention, facilities are provided for drawing the implement sidewise, i.e. in a transverse direction for inoperative transport purposes. Accordingly, a second tractor hitch 24 is carried at the extreme outer end of the tool bar 16.

Still referring to FIGS. 1 and 2, and additionally to FIG. 3, the outer end regions of the left and right tool bars 14 and 16 are adapted to be tractionally supported by front and rear free training caster wheel units or assemblies 30 and 32 respectively, such assemblies being identical and each consisting of the usual yoke 34, axle 36 and wheel 38, together with an upstanding yoke spindle 40. The front caster wheel assemblies 30 are operatively mounted on the forward or distal ends of respective carrier arms 42, while the rear caster wheel assemblies 32 are similarly operatively mounted on the rear or distal ends of respective rearwardly extending carrier arms 44.

The inner or proximate ends of each arm 42 and 44 of each tool bar 14 and 16 is pivoted near the base of a fixed upstanding reaction bracket 46 which is mounted on the associated tool bar 14 or 16 as the case may be, and a similar lift bracket 48 projects upwardly from the medial region of each arm 42 and 44. A hydraulic lift cylinder 50 extends between the upper end of each lift bracket 48 and its associated reaction bracket 46 and is effective upon contraction of the lift cylinder to raise the arm 42 or 44 relative to the associated tool bar.

Referring now to FIGS. 1, 2 and 4, a centrally disposed carrier arm 52 has its inner or forward proximate end pivotally secured to the base region of an upstanding reaction bracket 54 on the medial region of the rigid support bar 12. A lift bracket 56 projects upwardly from the medial region of the carrier arm 52 and a lift cylinder 58 extends between the upper ends of the two brackets 54 and 56 and is effective upon contraction thereof to raise the carrier arm relative to the support bar 12.

The rear or distal end of the carrier arm 52 has mounted thereon a special caster wheel assembly 60 which constitutes one of the salient features of the present invention. Whereas the caster wheel assemblies 30 and 32 are all free trailing assemblies at all times throughout their 360° caster spin when they are in engagement with the ground, the caster wheel assembly 60 is allowed to free trail on the ground only when the implement is traveling forwardly and is in its operative earth-working condition. When the implement is in its transport condition and traveling sidewise as previously described, means are provided for automatically locking the caster wheel assembly 60 in a precise trailing position, i.e. so that the plane of the caster wheel proper is parallel to the direction of transport, all in a manner and for a purpose that will be made clear presently.

The caster wheel assembly 60 is comprised of a yoke 62 having slanting yoke arms 64 and a generally flat substantially horizontal connecting bight portion or top wall 66 (see FIGS. 5, 6 and 7) from which there projects upwardly a yoke spindle 68 and which is secured thereto by a weldment 69. An annular bearing ring 70 encompasses the base of the spindle 68 and is welded as indicated at 72 to the wall 66. The spindle 68 is rotatably disposed in a sleeve 74 which projects through the distal end of the carrier arm 52 on an inclined bias as clearly shown in FIGS. 5 and 7, and is secured to such sleeve by top and bottom weldments 76. The tubular sleeve 74 projects an appreciable distance below the carrier arm 52 and the bearing ring 70 makes sliding interfacial engagement with the lower circular rim of the sleeve 74. A yoke axle 78 is carried at the lower end of the yoke arms 64 and supports a caster wheel 79.

As previously set forth, each carrier arm 42 and 44, as well as the centrally disposed carrier arm 52, has associated therewith hydraulic means whereby such arm may be raised or lowered relative to the supporting member on which it is pivoted. The terms "raised" and "lowered" as used herein are relative terms and, actually, when the implement is ground supported and independent from the tractor T, lowering of a given carrier arm has the effect of raising its associated supporting member relative to the ground or, alternatively, of raising its associated caster wheel assembly upwardly and away from the ground, depending upon the condition of the other carrier arms, i.e. whether they are in their raised or lowered positions. When the support bar 12 is tractor-mounted, an entirely different condition exists as will be described in detail presently.

When the implement framework 10 is used in association with a seed planter, the tool bars 12 and 14 may be equipped with the usual planter accoutrements such as leading furrow-creating and trailing furrow-closing discs, seed dispensing and distributing drums, tamping wheels, seed-conveying tubes or conduits and other devices which may be considered necessary or appropriate for effective ground preparation and planting operations. Such devices have not been disclosed herein since they bear no direct relation to the invention which consists of the nature of the framework 10 and the manner in which it is tractionally supported, either during planting operations or during transport.

Assuming the support bar 12 to be connected to the tractor hitch which, for convenience of description, will hereinafter be referred to as the forward hitch, and assuming that the implement is conditioned for planting operations, it is contemplated that all of the four caster wheels 38, shall ride tractionally on the ground. The various lift cylinders 50 and 58 will be actuated so that all of the carrier arms 42, 44 and 52 are in their "up" position, thereby lowering the tool bars 14 and 16 so that the earth-treating devices associated therewith will be lowered to their operative positions. Since the support bar 12 is tractor mounted, it is not subject to appreciable raising and lowering operations and the arm 52, in its raised position, maintains the caster wheel 79 off the ground in an inoperative position. All of the earth-working and planting tools and devices thus remain in their lowered operative positions.

For field transport, relative to the tractor T as shown in FIG. 1, the various cylinders 50 and 58 will be actuated so that the carrier arms 42, 44 and 52 are in their "down" position so that the earth-treating devices will be raised to their inoperative positions. In this position of the caster wheel 79, it functions as a lift assist wheel.

In the transport condition of the implement framework 10 when the tractor T is connected to the hitch 24 for sidewise motion of the implement in the line of travel of the tractor, it is contemplated that the framework shall be supported on only three caster wheels, namely the two front caster wheels 38 and the rear central caster wheel 79. However, for stabilizing purposes to prevent side sway, it is essential that te rear caster wheel 79 be locked so that the general plane thereof is substantially at a right angle to the axis of the carrier arm and thus extends parallel to the direction of motion as illustrated in FIG. 2. Accordingly, to prepare for endwise transport, the hydraulic lift cylinders 50 will be actuated to lower the two front carrier arms 42 and the lift cylinder 58 will be actuated to lower the central carrier arm 52, thereby raising the entire framework 10. The lift cylinders 50 are actuated to raise the two rear carrier arms 44, thereby raising the rear caster wheel assemblies 32 and their associated wheels 38 from the ground. The implement is thus left tractionally supported by the two front wheels 38 and the rear wheel 79. The tractor T is then connected to the transport hitch 24.

It has previously been stated that during sidewise transport in the direction of tractor travel, means are provided for locking the caster assembly 60 is a trailing position so that the caster wheel 79 will extend parallel to the path of transport movement. Accordingly, and with particular reference to FIGS. 5 to 8 inclusive, and also to FIGS. 1 and 2, a curved detent plate 80 is supported above the top wall of the caster yoke 62 by means of an upstanding post 82 and such plate extends generally radially outwardly from the caster spindle 74. Normally, during planting operations when the plane of the caster wheel 79 coincides with the axis of the support arm 52 as shown in FIGS. 1 and 6, the plate 80 in its entirety is disposed alongside the arm, albeit slightly below the level of the latter. However, during transport operations when the plane of the caster wheel 79 is at a right angle to the support arm 52, the detent plate 80 moves underneath the outer end region of the support arm 52 as shown in FIGS. 2 and 7. In this latter position of the detent plate 80, automatic detent means are provided for locking the plate in such position, thereby fixedly securing the caster yoke 62 against turning movement and maintaining the caster wheel 79 in the proper position for sidewise travel of the framework 10.

Accordingly, such detent locking means assumes the form of a pin and slot connection between the plate 80 and the carrier arm 52 and embodying a slot-like locking opening or hole 84 which is formed in the outer crest region of the curved detent plate, and a cooperating locking pin 86 which is loosely received in a cylindrical sleeve 88 which projects through the carrier arm 52 and is secured therein by weldments 90. Normally, during planting operations when the implement is traveling forwardly so that the plane of the caster wheel 79 is coincident with the axis of the carrier arm 52 and the plate 80 is withdrawn from beneath the support arm 52, the locking pin 86 will be maintained within a pair of aligned storage holes 92 which are formed in the carrier arm 52 a slight distance beyond the radial reach of the curved detent plate 80. However, when converting the framework 10 to its transport condition, by actuating the various lift cylinders 50 and 58 and transferring the tractor from the planting hitch to the transport hitch 24 as previously described, the operator will withdraw the locking pin from the storage holes 92 and place it within the sleeve 88, whereupon the lower end of the pin will be disposed directly within the circular path of movement of the slot or opening 84 as the detent plate 80 orbits about the spindle 68 during rotation of the caster yoke 62 incident to initial travel of the framework 10 sidewise. Thus, as such sidewise motion of the implement commences, the direction change effected by the caster wheel 79 will cause rotation of the detent plate 80 in one direction or the other and the lower end of the locking pin 86 will effect camming engagement with the upper curved surface of such plate on either side of the locking hole 84, depending on which way the caster yoke 62 rotates, thereby raising the pin until such time as it encounters the locking slot or opening 84, whereupon it will fall automatically by gravity into such hole and cause the entire caster assembly 60 to become locked in the proper position for sidewise travel of the implement. The wheel, thus locked, has a stabilizing effect upon the implement and prevents undue lateral swaying thereof during the transport operation.

It is obvious that the implement may be converted back to its planting condition by the simple expedient of attaching the tractor T to the hitch, withdrawing the locking pin 86 from the sleeve 88, and replacing such pin in the storage holes 92, and thereafter actuating the lift cylinders in such a manner as to bring all of the carrier arms to their raised positions, thereby lowering the tool bars 14 and 16 so that the earth-working and planting devices carried thereby will become effective.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In an agricultural implement, in combination, an elongated transversely extending tool-carrying framework designed for reception of earth-working tools thereon in laterally spaced relationship, a first tractor hitch mounted on said framework in the medial region thereof for enabling the implement to be towed forwardly so that said framework advances in broadside fashion, a second tractor hitch mounted on one end of the framework for enabling the implement to be towed sidewise so that the framework advances endwise, a plurality of ground-engaging caster wheels carried by and operatively supporting the framework, all of said wheels being of the free-trailing caster type, and means automatically effective to lock one of said caster wheels for rotation in a plane parallel to the framework when the implement is towed endwise by said second hitch, said automatically effective locking means for said one caster wheel embodying a caster yoke for said wheel, a detent plate mounted on said yoke for movement in unison therewith and having a ramp portion thereon, and a locking pin movably mounted on the framework, slidably engageable with said ramp portion, and designed for locking cooperation with an opening which is formed in said detent plate and which moves into register with the locking pin when the caster wheel moves into its position of parallelism with said framework.

2. In an agricultural implement, the combination set forth in claim 1, wherein said yoke is provided with an upstanding caster spindle which is rotatably journalled in the framework, the detent plate is provided with an upwardly presented generally cylindrical cam surface having a linear crest portion which projects radially outwardly of said spindle, said opening is formed in the distal end region of said crest portion, and the lower end of said locking pin is designed for selective camming engagement with the detent plate on either side of the opening, depending upon the direction of rotation of the yoke as the opening moves into register with said locking pin.

3. In an agricultural implement, the combination set forth in claim 1, wherein said locking pin projects loosely and slidably through said framework, has its lower end engageable with said detent plate under the influence of gravity, is removable endwise from the framework, and a storage opening is formed in said framework in the vicinity of said spindle for reception of the locking pin when it is desired that the associated caster wheel shall function for free trailing purposes.

4. In an agricultural implement, the combination set forth in claim 1, wherein hydraulic means are provided for individually raising and lowering said caster wheels relative to the framework for consequent lowering and raising of the framework relative to the ground.

5. In an agricultural earth-working implement, in combination, a rigid transversely extending horizontal support bar, a pair of normally aligned transversely extending horizontal tool bars designed for reception of earth-working tools thereon in laterally spaced relation and having their adjacent ends pivotally connected to the support bar on opposite sides of the central longitudinal axis of the implement, front and rear ground-engaging caster wheels mounted on the outer ends of each said tool bar whereby each said bar is constrained to rise and fall in conformity with an undulatory ground pattern, a central ground-engaging caster wheel mounted on said support bar and disposed rearwardly thereof, said support bar being provided with a centrally disposed tractor hitch for enabling the implement to be towed forwardly so that said support bar and tool bars advance in broadside fashion, one of said tool bars being provided with a second tractor hitch at its outer end for enabling the implement to be towed sidewise so that the support bar and tool bars advance endwise, all of said caster wheels being of the free-trailing caster type, and means automatically effective to lock said central caster wheel for rotation in a plane parallel to said support bar and tool bars when the implement is towed endwise by said second tractor hitch.

6. In an agricultural implement, the combination set forth in claim 5, wherein each of said front caster wheels is mounted on the distal end of a forwardly extending outer carrier arm which is pivoted at its rear proximate end to its associated tool bar, each of said rear caster wheels is mounted on the rear distal end of a rearwardly extending carrier arm which is pivoted at its front proximate end to its associated tool bar, the central caster wheel is mounted on the rear distal end of a rearwardly extending central carrier arm which is pivoted at its forward proximate end to the support bar, and hydraulic lift means are provided for individually raising and lowering each of said carrier arms.

7. In an agricultural implement, the combination set forth in claim 6, wherein the hydraulic lift means for each of the front and rear outer caster wheels comprises a hydraulic lift cylinder operatively connected between each outer arm and its associated tool bar, and the hydraulic lift means for the central caster wheel comprises a hydraulic lift cylinder operatively connected between a medial region of said central carrier arm and the support bar.

8. In an agricultural implement, the combination set forth in claim 6, wherein said automatically effective locking means for said central caster wheel embodies a caster yoke for such wheel and which underlies said central carrier arm, and cooperating detent elements on said latter arm and yoke which move into locking cooperation with each other when said central caster wheel assumes its position of parallelism with the support bar.

9. In an agricultural implement, the combination set forth in claim 6, wherein said automatically effective locking means for said central caster wheel embodies a caster yoke for such wheel and which underlies said central carrier arm, a detent plate mounted on said yoke for movement in unison therewith and having a ramp portion thereon, and a locking pin movably mounted on said central carrier arm, slidably engageable with said ramp portion, and designed for locking cooperation with an opening which is formed in said detent plate and which moves into register with the locking pin when the caster wheel moves into its position of parallelism with the support bar.

10. In an agricultural implement, the combination set forth in claim 9, wherein said yoke is provided with an upstanding caster spindle which is rotatably journalled in the central carrier arm, the detent plate is provided with an upwardly presented generally cylindrical cam surface having a linear crest portion which projects radially outwardly of said spindle, said opening is formed in the distal end region of said crest portion, and the lower end of the locking pin is designed for selective camming engagement with the detent plate on either side of the opening, depending upon the direction of rotation of the yoke as the opening moves into register with said locking pin.

11. In an agricultural implement, the combination set forth in claim 10, wherein said locking pin projects loosely and slidably through said central carrier arm, has its lower end engageable with said detent plate under the influence of gravity, is removable endwise from the carrier arm, and a storage opening is formed in said carrier arm inwardly of its rear distal end and beyond the radial reach of said detent plate.

* * * * *